(12) United States Patent
Russell

(10) Patent No.: US 10,070,251 B1
(45) Date of Patent: Sep. 4, 2018

(54) METHODS, SYSTEMS, AND COMPUTER READABLE MEDIA FOR VALIDATING USER EQUIPMENT (UE) LOCATION

(71) Applicant: Oracle International Corporation, Redwood Shores, CA (US)

(72) Inventor: Travis Earl Russell, Clayton, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/636,118

(22) Filed: Jun. 28, 2017

(51) Int. Cl.
 *H04W 4/02* (2018.01)
 *H04M 15/00* (2006.01)
 *H04W 8/02* (2009.01)

(52) U.S. Cl.
 CPC .............. *H04W 4/02* (2013.01); *H04M 15/41* (2013.01); *H04W 8/02* (2013.01)

(58) Field of Classification Search
 CPC ....... H04W 4/02; H04W 12/06; H04W 12/10; H04W 4/04; H04W 4/10; H04W 64/003; H04L 51/20; H04L 63/0281; H04L 63/102; H04M 2242/30
 USPC .......................................... 455/456.1–456.2
 See application file for complete search history.

(56) References Cited

U.S. PATENT DOCUMENTS

| 7,043,754 | B2 | 5/2006 | Arnouse |
| 8,045,956 | B2 | 10/2011 | Sun et al. |
| 8,615,217 | B2 | 12/2013 | Ravishankar et al. |
| 8,879,431 | B2 | 11/2014 | Ridel et al. |
| 9,191,803 | B2 | 11/2015 | Patel et al. |
| 9,240,946 | B2 | 1/2016 | Cai et al. |
| 9,374,840 | B2 | 6/2016 | Monedero Recuero |
| 9,628,994 | B1 * | 4/2017 | Gunyel ................. H04W 12/12 |
| 2004/0140908 | A1 | 7/2004 | Gladwin et al. |

(Continued)

FOREIGN PATENT DOCUMENTS

EP    1 067 492 A2    1/2001

OTHER PUBLICATIONS

Non-Final Office Action for U.S. Appl. No. 15/376,631 (dated Jun. 16, 2017).

(Continued)

*Primary Examiner* — Nathan Taylor
(74) *Attorney, Agent, or Firm* — Jenkins, Wilson, Taylor & Hunt, P.A.

(57) ABSTRACT

A method for validating UE location includes receiving, at a network gateway, a signaling message for updating a location of a UE with a mobile communications network. A first indication of user equipment location is extracted from the signaling message. One of: a cloud-based UE location database containing UE location information obtained from a UE location reporting application resident on the UE, a cloud-based loyalty card transaction database containing loyalty card transaction records indexed by UE identifiers, and a mobile location center (MLC) that obtains UE location information by requesting or receiving the UE location information from a mobility management entity (MME) is queried to obtain a second indication of location of the UE. It is determined from a relationship between the first and second indications of location of the UE that the signaling message is suspicious. In response to determining that the signaling message is suspicious, a policy rule is applied to processing of the signaling message.

20 Claims, 7 Drawing Sheets

(56) References Cited

U.S. PATENT DOCUMENTS

| | | | |
|---|---|---|---|
| 2007/0174082 A1* | 7/2007 | Singh | G06Q 20/20 |
| | | | 705/44 |
| 2008/0222038 A1 | 9/2008 | Eden | |
| 2009/0045251 A1 | 2/2009 | Jaiswal et al. | |
| 2009/0195349 A1 | 8/2009 | Frader-Thompson et al. | |
| 2011/0014939 A1 | 1/2011 | Ravishankar et al. | |
| 2011/0029655 A1 | 2/2011 | Forbes, Jr. et al. | |
| 2011/0063126 A1 | 3/2011 | Kennedy et al. | |
| 2011/0124317 A1 | 5/2011 | Joo | |
| 2011/0173122 A1 | 7/2011 | Singhal | |
| 2011/0225091 A1* | 9/2011 | Plastina | G06Q 20/3224 |
| | | | 705/44 |
| 2011/0307381 A1 | 12/2011 | Kim et al. | |
| 2012/0099715 A1 | 4/2012 | Ravishankar et al. | |
| 2012/0131121 A1* | 5/2012 | Snyder | G06Q 20/401 |
| | | | 709/206 |
| 2012/0203663 A1* | 8/2012 | Sinclair | G06F 21/30 |
| | | | 705/26.41 |
| 2014/0280645 A1* | 9/2014 | Shuman | H04W 4/04 |
| | | | 709/206 |
| 2016/0088461 A1 | 3/2016 | Jiang | |
| 2016/0269566 A1 | 9/2016 | Gundamaraju et al. | |
| 2016/0292687 A1* | 10/2016 | Kruglick | G06Q 20/12 |
| 2017/0345006 A1* | 11/2017 | Kohli | G06Q 20/4093 |
| 2018/0020324 A1* | 1/2018 | Beauford | H04W 4/021 |

OTHER PUBLICATIONS

Final Office Action for U.S. Appl. No. 13/047,287 (dated Mar. 10, 2017).

Commonly-assigned, co-pending U.S. Appl. No. 15/408,155 for "Methods, Systems, and Computer Readable Media for Validating a Redirect Address in a Diameter Message," (Unpublished, filed Jan. 17, 2017).

Commonly-assigned, co-pending U.S. Appl. No. 15/376,631 for "Methods, Systems, and Computer Readable Media for Validating Subscriber Location Information," (Unpublished, filed Dec. 12, 2016).

Non-Final Office Action for U.S. Appl. No. 13/047,287 (dated Aug. 25, 2016).

Advisory Action Before the Filing of an Appeal Brief for U.S. Appl. No. 13/047,287 (dated Oct. 16, 2015).

Final Office Action for U.S. Appl. No. 13/047,287 (dated Jun. 4, 2015).

"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9)," ETSI TS 129 172, V9.6.0, pp. 1-27 (Apr. 2015).

Non-Final Office Action for U.S. Appl. No. 13/047,287 (dated Sep. 25, 2014).

Supplemental Notice of Allowance and Fee(s) Due for U.S. Appl. No. 12/823,559 (dated Aug. 23, 2013).

Notice of Allowance and Fee(s) Due for U.S. Appl. No. 12/823,559 (dated Aug. 1, 2013).

Email to U.S. Patent and Trademark Office dated Jun. 28, 2013.

Final Office Action for U.S. Appl. No. 12/823,559 (dated Apr. 11, 2013).

Final Office Action for U.S. Appl. No. 13/047,287 (dated Jan. 31, 2013).

Non-Final Office Action for U.S. Appl. No. 12/823,559 (dated Nov. 14, 2012).

Restriction and/or Election Requirement for U.S. Appl. No. 12/823,559 (dated Aug. 27, 2012).

Non-Final Office Action for U.S. Appl. No. 13/047,287 (dated Jun. 6, 2012).

"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).

"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).

Press Release, "SmartSynch SmartMeters Communicate Using the Larges and Most Available Wireless Networks in the World," http://www.smartsynch.com/SmartSynch_gprs.htm (Downloaded from the Internet on Jul. 5, 2011).

"Solution: Itron CENTRON GPRS," Data Sheet, http://www.smartsynch.com/SmartSynch_itron_centron.htm (Downloaded from the Internet on Jul. 5, 2011).

Myers, "SmartSynch Introduces Innovative 'DCX' Smart Grid Solution at DistribuTECH," SmartSynch News, http://www.appmesh.com/news/020309.htm Feb. 3, 2009 (Downloaded from the Internet on Jul. 5, 2011).

"NES System Architecture," Data Sheet, Copyright 2009 (Downloaded from the Internet on Jul. 5, 2011).

"Wireless M-Bus and ZigBee®-enabled GSM/GPRS/ EDG Gateway for Smart Metering Introduced," Metering.com, http://www.metering.com/node/13550 Sep. 19, 2008 (Downloaded from the Internet on Jul. 5, 2011).

Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, 3 pgs. (Apr. 23, 2009).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).

Hakala et al., "Diameter Credit-Control Application," RFC 4006, pp. 1-115 (Aug. 2005).

Non-Final Office Action for U.S. Appl. No. 15/408,155 (dated Jan. 9, 2018).

Final Office Action for U.S. Appl. No. 15/376,631 (dated Nov. 28, 2017).

Commonly-assigned, co-pending U.S. Appl. No. 15/666,300 for "Methods, Systems, and Computer Readable Media for Mobility Mangement Entity (MME) Authentication for Outbound Roaming Subscribers Using Diameter Edge Agent (DEA)," (Unpublished, filed Aug. 1, 2017).

"LTE International Roaming Whitepaper," http://carrier.huawei.com/en/technical-topics/core-network/lte-roaming-whitepaper, pp. 1-16, (Downloaded May 12, 2017).

"Digital cellular telecommunications system (Phase 2+) (GSM); Universal Mobile Telecommunications System (UMTS); Universal Georgraphical Area Description (GAD) (3GPP TS 23.032 V 14.0.0 Release 14)," ETSI TS 123 032 V14.0.0, pp. 1-30 (May 2017).

"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).

"Edge Roputer (DEA)," http://www.mavenir.com/our-products/mobile/edge-router-dea, pp. 1-7 (Copyright 2017).

"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).

"Snyiverse Guide to LTE Roaming and Interoperability," https://www.syniverse.com/assets/files/custom_content/lte-roaming-interoperability-guide.pdf, pp. 1-11 (Jan. 8, 2016).

"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).

(56) References Cited

OTHER PUBLICATIONS

"Diameter Signaling Control (DSC)," https://www.extent.com/diameter-signaling-control-dsc/, pp. 1-3 (Copyright 2016).

Kotte, "Analysis and Experimental Verification of Diameter Attacks in Long Term Evolution Networks," http://www.diva-portal.org/smash/get/diva2:951619/FULLTEXT01.pdf, pp. 1-72 (2016).

"The Dialogic® Helix™ Signaling Controller," https://www.dialogic.com/-/media/products/docs/brochures/14090-helix-br.pdf, pp. 1-5 (Aug. 2015).

"Digital cellular telecommunications system (Phase 2+); Universal Monile Telecommunications System (UMTS); LTE; Location Services (LCS); Service description; Stagel (3GPP TS 22.071 V 11.0.0 Release 11," ETSI TS 122 071 V11.0.0, pp. 1-50 (Oct. 2012).

"Net-Net Diameter Director," http://www.oracle.com/us/industries/communications/net-net-diameter-director-ds-1985034.pdf, pp. 1-9 (Copyright 2012).

"Digitall cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).

Examiner's Answer for U.S. Appl. No. 13/047,287 (dated Feb. 26, 2018).

Advisory Action Before the Filing of an Appeal Brief and AFCP 2.0 Decision for U.S. Appl. No. 15/376,631 (dated Feb. 2, 2018).

"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).

\* cited by examiner

US 10,070,251 B1

METHODS, SYSTEMS, AND COMPUTER READABLE MEDIA FOR VALIDATING USER EQUIPMENT (UE) LOCATION

TECHNICAL FIELD

The subject matter described herein relates to enhancing telecommunications network security. More particularly, the subject matter described herein relates to validating UE location as a condition to allowing processing of location update signaling messages.

BACKGROUND

Telecommunications signaling networks, like most computer networks, have certain attack vulnerabilities. For example, in a mobile communications network, if an attacker gains access to subscriber information maintained by a home location register (HLR) or a home subscriber server (HSS), the attacker can use the information to eavesdrop on text messages and voice conversations involving the subscriber. Accordingly, it is desirable to protect subscriber information maintained by an HLR or HSS.

Protecting subscriber information maintained by an HLR or HSS can be difficult because subscriber information is transmitted over the network in response to location update procedures and there is no authentication or verification of the initiator of such procedures. For example, when a UE attaches to a network, the attachment point (the mobile switching center/visitor location register (MSC/VLR) in SS7 networks or the mobility management entity (MME) in Diameter networks) sends messaging to the HLR or HSS to update the location of the UE with the HLR or HSS. The HLR or HSS responds with subscription information concerning the subscriber. It is the subscription information that could possibly be used to eavesdrop or otherwise affect communications to and from the UE.

If an attacker masquerades as a valid network element serving the UE but is instead acting as an interception point for subscription information, the attacker can use the update location procedure to obtain the subscription information. For example, the attacker can send a fake update location message to the HLR or HSS network of the subscriber. The HLR or HSS may respond to the attacker with subscription information for the subscriber as if the attacker is a valid MSC/VLR or MME where the UE is currently registered. The subscription information is transmitted to the attacker in a location update response message. Once the attacker has the subscription information, the attacker can eavesdrop on communications involving the subscriber.

Credit card companies have used location information from mobile communications networks to validate credit card transactions. For example, a credit card company or an issuing bank can use location information from mobile communications networks to verify that the location of a credit card transaction corresponds to a location of the user. If the two locations do not match, the credit card company may request transaction verification from the subscriber. However, while such verification protects against fraudulent credit card purchase transactions, location update transactions in the underlying mobile communications network are not policed or otherwise affected.

Accordingly, there exists a need for methods, systems, and computer readable media for validating user equipment location.

SUMMARY

Methods, systems, and computer readable media for validating UE location are disclosed. One method for validating user equipment (UE) location includes receiving, by a network gateway, a signaling message for updating a location of a UE with a mobile communications network. The method further includes extracting a first indication of location of the UE from the signaling message. The method further includes obtaining, by querying one of a cloud-based UE location database containing UE location information obtained from a UE location reporting application resident on the UE, a cloud-based loyalty card transaction database containing loyalty card transaction records indexed by UE identifiers, and a mobile location center (MLC) that obtains UE location information by requesting or receiving the UE location information from a mobility management entity (MME), a second indication of location of the UE. The method further includes determining, from a relationship between the first and second indications of location of the UE, that the signaling message is suspicious. The method further includes, in response to determining that the signaling message is suspicious, applying a policy rule to processing of the signaling message.

According to one aspect of the subject matter described herein, the signaling message from which the first indication of location of the UE is extracted comprises one of a Diameter update location request (ULR) message and an SS7 location update message.

According to another aspect of the subject matter described herein, the first indication of location of the UE comprises a network identity extracted from the signaling message. In one example, the network identity may be a visited public land mobile network (PLMN) identifier. The visited PLMN identifier may include a mobile network code (MNC) and a mobile country code (MCC), which can be compared against other location information to validate UE location.

According to yet another aspect of the subject matter described herein, the second indication of location of the UE that is compared with the information extracted from the signaling message may include global positioning system (GPS) coordinates of the UE. In such an implementation, determining, from a relationship between the first and second indications of location of the UE, that the signaling message is suspicious may include determining that a location indicated by the GPS coordinates does not match the first indication of location of the UE extracted from the signaling message. In one example, the GPS coordinates of the UE may be obtained from the cloud-based UE location database containing UE location information populated by the UE location reporting application on the UE.

According to yet another aspect of the subject matter described herein, the second indication of location of the UE to be compared with the location information extracted from the signaling message may include a loyalty card transaction location obtained from the cloud-based loyalty card transaction database. In such an implementation, determining, from a relationship between the first and second indications of location of the UE, that the signaling message is suspicious includes determining that the loyalty card transaction location does not match the first indication of location of the UE.

According to yet another aspect of the subject matter described herein, the second indication of location of the UE that is compared with the information extracted from the signaling message is a location obtained from the cloud-based loyalty card transaction database. In such a case, determining that the signaling message is suspicious includes determining that the loyalty card transaction location does not match the first indication of location of the UE.

As used herein, the term "loyalty card transaction" includes credit card transactions, debit card transactions, or other electronic transactions involving a plastic or software-implemented card of a telecommunication network subscriber for which transaction location information is stored.

According to yet another aspect of the subject matter described herein, applying the policy rule in response to the locations not matching includes blocking the signaling message from being forwarded to a home subscriber server (HSS) or a home location register (HLR), marking the signaling message as suspicious, and forwarding a copy of the message to fraud analytics platform.

According to yet another aspect of the subject matter described herein, a system for validating user equipment (UE) location is disclosed. The system includes a network gateway. The network gateway includes a message processor located in the network gateway for receiving a signaling message for updating a location of a UE with a mobile communications network. The system further includes a UE location validation module operatively associated with the network gateway for extracting a first indication of location of the UE from the signaling message, obtaining, by querying one of a cloud-based UE location database containing UE location information obtained from a UE location reporting application resident on the UE, a cloud-based loyalty card transaction database containing loyalty card transaction records indexed by UE identifiers, and a mobile location center (MLC) that obtains UE location information by requesting or receiving the UE location information from a mobility management entity (MME), a second indication of location of the UE, and determining, from a relationship between the first and second indications of location of the UE, that the signaling message is suspicious. In response to determining that the signaling message is suspicious, the network gateway applies a policy rule to processing of the signaling message.

As used herein, the term "location update message" refers to a message for updating a location and other mobile subscriber in a telecommunications network. "Location update message" is intended to cover Diameter update location request messages, SS7 mobile application part (MAP) update location messages, or other message for updating the location of a telecommunications network subscriber with the network.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
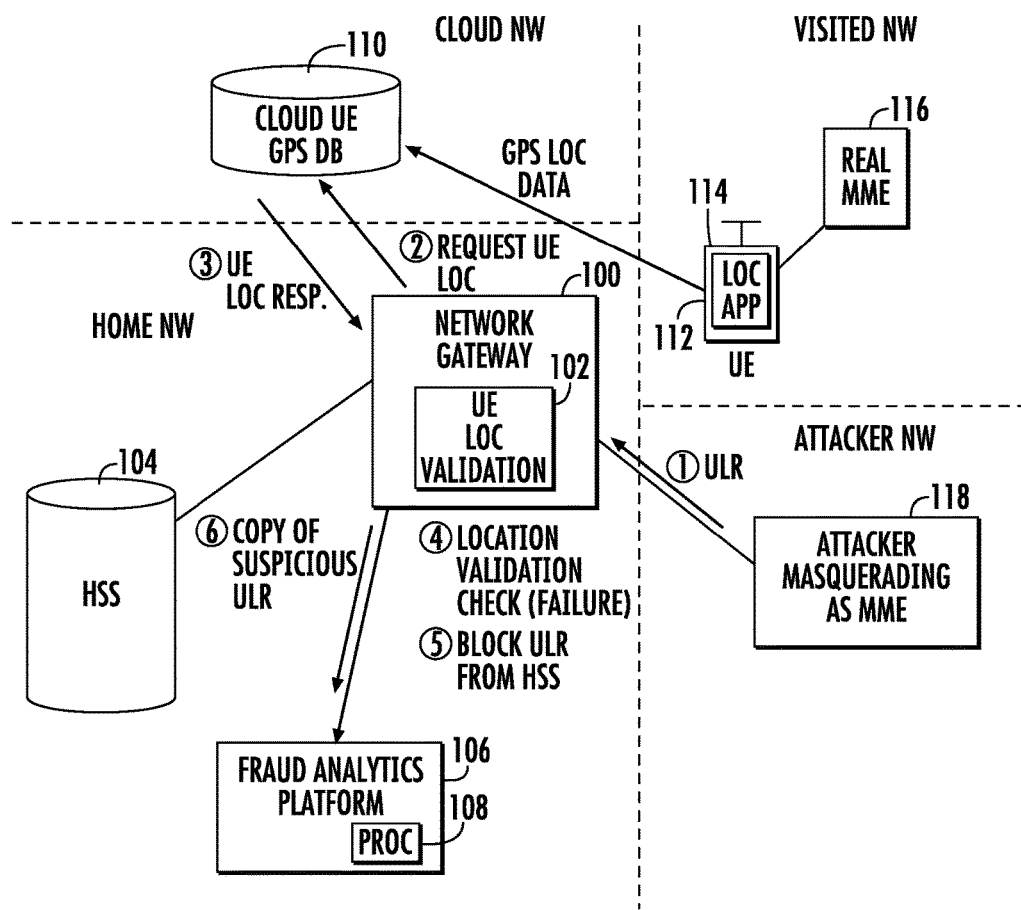
FIG. 1 is a network diagram illustrating methods and systems for validating UE location using GPS data obtained from mobile devices made available through a cloud network.

The subject matter described herein relates to methods, systems, and non-transitory computer readable media for validating UE location and reducing signaling network attack vulnerability using such validation. FIG. 1 is a network diagram illustrating methods and systems for validating UE location according to the subject matter described herein. Referring to FIG. 1, several networks are illustrated. In FIG. 1, a home network of a mobile subscriber includes a network gateway 100 with a UE location validation module 102 for validating UE location. The home network also includes an HSS 104 that stores subscriber data records including subscription data that it is desirable to protect. A fraud analytics platform 106 including at least one processor 108 analyzes messages tagged as suspicious by UE location validation module 102 for the presence of location fraud. A cloud network that includes a cloud UE GPS database 110 is also illustrated. Cloud UE GPS database 110 stores GPS coordinates of UEs obtained from a location reporting application 112 that may reside on each UE 114.

In the illustrated example, UE 114 is roaming in a network external to the home network and is attached to a real MME 116. Location reporting application 112 may interface with a GPS transceiver on UE 114 to determine the UE's GPS location. UE location reporting application 112 may either periodically push GPS location data to cloud UE GPS database 110 or provide the GPS location data to cloud UE GPS database in response to queries from cloud UE GPS database 110. Either implementation is intended to be within the scope of the subject matter described herein.

Another network illustrated in FIG. 1 is the attacker network. In the attacker network, an attacker 118 masquerades as a real MME. Masquerading as a real MME includes generating valid messages, such as Diameter update location request (ULR) messages and forwarding those messages to other networks in an to attempt to obtain subscriber information from those networks. Attacker 118 may be a computing platform with the capability to communicate over a network and generate location update messaging, such as Diameter and/or SS7 location update messaging. If attacker 118 can generate location update messaging and attacker 118 has access to a valid subscriber identifier, such as an international mobile station identifier (IMSI) a mobile subscriber integrated services digital network (MSISDN) number and/or an international mobile equipment identifier (IMEI), then attacker 118 can generate an attack using location update messaging to obtain subscription information for the identified subscriber from HSS 104.

In the illustrated example, attacker 118 generates a Diameter update location request (ULR) message and sends the message to network gateway 100. The ULR message contains the identifier of UE 114 but directs a response back to attacker 118 instead of to MME 116 where UE 114 is actually registered. Network gateway 100 receives the ULR message and, without the UE location validation procedures described herein, would simply forward the message to HSS 104. HSS 104 would then formulate and send an update location answer (ULA) message with the subscription information. Network gateway 100 would then route the ULA message to attacker 118. Attacker 118 would then extract the subscription information from the ULA message and use the information to intercept calls or other communications to or from UE 114.

However, rather than simply passing the ULR message to HSS 104, UE location validation module 102 queries a source separate from the update location request message to obtain UE location information and uses that information to perform a location validation. In FIG. 1, location validation module 102 queries cloud UE GPS database 110 to request the GPS location of the UE. Cloud UE GPS database 110 accesses the record for the UE in its database and transmits a UE location response to the UE location validation module 102. The interfere between cloud UE GPS database 110 and UE location validation module 102 may be an application programming interface (API) that defines messages, message parameters, and function calls to obtain UE location from cloud UE GPS database 110.

Cloud UE GPS database 110 may obtain the GPS location of UE 114 by first checking to see whether database 110 contains a current GPS location for UE 114. If the location for UE 114 in database 110 is current (e.g., updated within a predetermined time period from the current time, where the time period is configurable by the network operator), cloud UE GPS database 110 may provide the stored GPS location as the current location of the UE. If cloud UE GPS database 110 does not contain a current GPS location of a UE, cloud UE GPS database 110 may query UE 114 for its current location. In response to the query, location reporting application 112 may respond with the current GPS, coordinates of UE 114. Cloud UE GPS database 110 may receive the GPS location from UE location reporting application 112 and forward the location information to UE location validation module 102.

Upon receiving GPS location data of UE 114, UE location validation module 102 performs a location validation check by comparing the UE location information in the ULR with the GPS coordinates provided by cloud UE GPS database 110. If the ULR location information matches the GPS location information, gateway 100 will forward the ULR to a HSS 104 for further update location processing. However, if the GPS location data does not match the location data in the ULR, the location validation fails and UE location validation module 102 blocks the ULR from being forwarded to HSS 104.

In response to unsuccessful validation of a UE location, UE location validation module 102 may mark the ULR message as suspicious and forward a copy of the suspicious message to fraud analytics platform 106. Fraud analytics platform 106 may analyze the ULR message, extract information identifying attacker 118, and use that information to populate an access control list in network gateway 100 to block subsequent messages from attacker 118.

Thus, in FIG. 1, UE GPS data provided by location reporting application 112 resident on UE 114 and stored in the cloud network is used to validate UE device location and reduce the likelihood of a successful attack to the obtain subscription data stored in HSS 104.

As stated above, UE location validation module 102 compares location information extracted from ULR messages with GPS coordinates obtained from cloud GPS database 110. Because ULR messages do not contain GPS coordinates, some mapping may be required. Table 1 shown below includes mandatory and optional fields that may be included in a Diameter ULR message.

TABLE 1

Update Location Request Mandatory and Optional Fields

| Information element name | Mapping to Diameter Attribute Value Pair (AVP) | Cat. | Description |
| --- | --- | --- | --- |
| User Name (See IETF RFC 3588 | User-Name | M | This information element (IE) shall contain the permanent identify user, i.e. the IMSI. See 3GPP TS 23.003. |
| Supported Features (See 3GPP TS 29.229 | Supported-Features | O | If present, this IE shall contain the list of features supported by the origin host. |
| Terminal Information | Terminal-Information | O | This IE shall contain information about the user's mobile equipment. Within this information Element, only the IMEI and the Software-Version AVPs shall be used on the 56a/56d interface. |
| ULR Flags (See 7.3.7) | ULR-Flags | M | This IE contains a bit mask. See 7.3.7 for the meaning of the bits. |
| Visited PLMN ID | Visited-PLMN-ID | M | This IE shall contain the MCC and the MNC, see 3GPP TS 23.003. It may be used to apply roaming based features. |
| Visited PLMN ID | Visited-PLMN-ID | M | This IE shall contain the MCC and the MNC, see 3GPP TS 23.003. It may be used to apply roaming based features. |
| Radio Access Technology (RAT) Type | RAT-Type | M | This IE contains the radio access type the UE is using. |

In Table 1, the update location request message includes a visited public land mobile network (PLMN) ID field. The visited PLMN ID identifies the mobile country code (MCC) and mobile network code (MNC) to which the UE is currently attached. The country and network information can be compared with the GPS coordinates obtained from cloud UE GPS database 110 to determine whether the ULR is suspicious or not. For example, if the GPS coordinates obtained from cloud UE GPS database 110 indicate that the UE is in a country that does not match the country code extracted from the ULR message, the ULR message may be identified as suspicious. Similarly, if the GPS coordinates extracted from database 110 do not match a location within the coverage area of the network indicated by the mobile network code in the visited PLMN ID field, the ULR message may be marked as suspicious. If the GPS coordinates obtained from cloud GPS database 110 match the country and network obtained from the ULR message, the UE location validation passes and UE location validation module 102 may forward the ULR message to HSS 104 for further location update processing.

Figure 2:
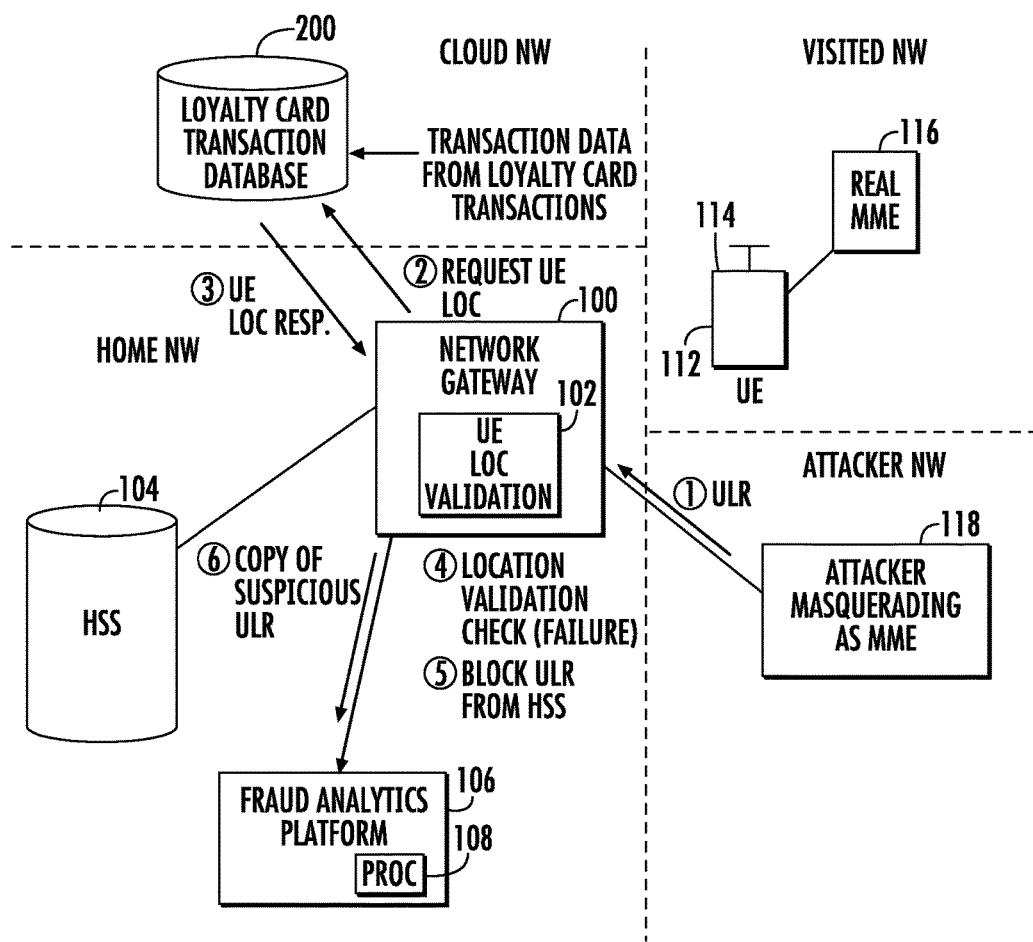
FIG. 2 is a network diagram illustrating methods and systems for validating UE location using loyalty card transaction information in a cloud network.

In FIG. 1, GPS location data provided by the UEs to a cloud-based location database is used by UE location validation module 102 to validate UE location. In an alternate implementation, UE location can be validated using location information obtained from a cloud-based loyalty card transaction database. FIG. 2 illustrates such an implementation. In FIG. 2, a loyalty card transaction database 200 obtains UE location information from loyalty card transactions, such as credit card transactions, debit card transactions, or other electronic transactions for which transaction location information is stored. Such transaction information can be obtained from conventional plastic credit card or debit card transactions or from transactions involving software implemented cards maintained on UEs. Such transactions can include an identifier, such as a personal account number (PAN) number that can be referenced to a subscriber and to a UE. Such transaction data also include time information and location information of the transactions. Thus, to be used for validating UE location, loyalty card transaction database 200 can be updated or augmented to include UE identification information, such as MSISDN, IMSI and/or IMEI numbers. Table 2 shown below illustrates an example of records that may be maintained in loyalty card transaction database 200 to support UE location validation.

TABLE 2

Loyalty Card Transaction Data Supporting UE Location Validation

| UE Identifier | Loyalty Card ID | Transaction Location | Transaction Time |
|---|---|---|---|
| 919 493 8000 | XXXX XXXX 4200 | Raleigh, NC | 0900; Jun. 7, 2017 |
|  | XXXX XXXX 4200 | Morrisville, NC | 1200; Jun. 7, 2017 |
|  | XXXX XXXX 4200 | Raleigh, NC | 1800; Jun. 7, 2017 |

In Table 2, loyalty card transaction records for a particular day for UE identifier 9194938000 are illustrated. The UE identifier can be provisioned in database 200 by the operator of database 200, for example, when the mobile subscriber signs up for a new loyalty card. Alternatively, database 200 can be dynamically provisioned when the UE is used to conduct loyalty card transactions. In the illustrated example, the record includes the loyalty card identifier which may be a PAN number, the transaction location, and the transaction time. The transaction location may be any indication of location that is stored for a loyalty card transaction. To facilitate illustration, the city and state of the transaction are shown. However, it is understood that more precise locations, such as retail store locations or GPS locations of transactions, may be stored. The record also includes a transaction time, which is illustrated as a time of day and a date.

In order to validate a UE's location using loyalty card transaction information maintained in loyalty card transaction database 200, when UE location validation module 102 receives a ULR message from MME or an attacker masquerading as an MME, UE location validation module 102 may query loyalty card transaction database 200. Loyalty card transaction database 200 may respond by providing records, such as those illustrated in Table 2, that show the location of loyalty card transactions involving the subscriber on a given day. UE location validation module 102 may compare the location information extracted from the ULR message with the transaction location information obtained from loyalty card transaction database 200 and determine whether there is a match. If the ULR-message-obtained location information matches the location information obtained or derived from loyalty card transaction database 200, UE location validation module 102 may forward the ULR message to HSS 104 without further UE location validation processing. However, if the location information extracted from the ULR message does not match the information obtained or derived from loyalty card transaction database 200, location validation module 102 may block the sending of the ULR message to HSS 104, mark the ULR message as suspicious, and forward a copy of the ULR message to fraud analytics platform 106

Fraud analytics platform 106 may analyze the message and possibly populate an access control database on network gateway 100 to block further messages from the attacker masquerading as a real MME. For example, using the data in Table 1, if the ULR message contains data that indicates that the UE is registered at an MME in Los Angeles, Calif. on 6/7/17, that data does not match the transaction location information obtained from database 200 because all of the entries for the subscriber in database 200 indicate that the subscriber is in North Carolina on Jun. 7, 2017. Accordingly, in such a case, UE location validation module 102 would block the ULR message and send the message to fraud analytics platform 106.

Figure 3A:
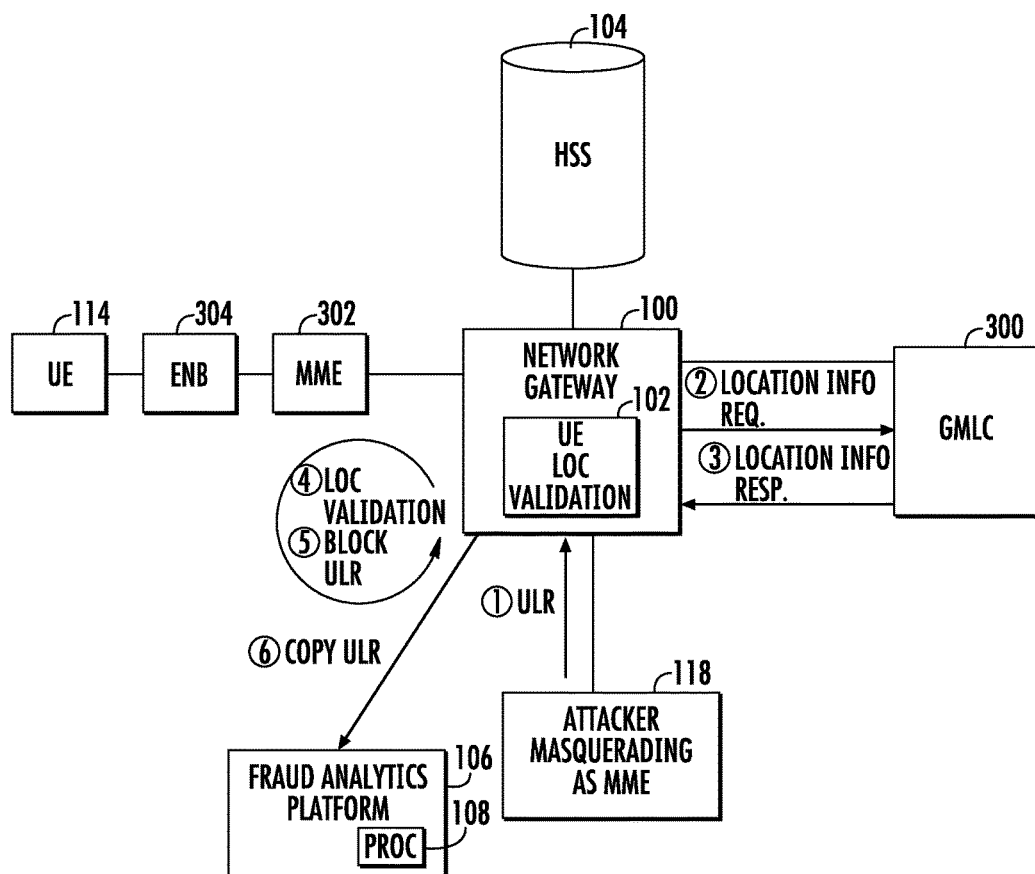
FIGS. 3A-3C are network diagrams illustrating methods and systems for validating UE location using location data made available by a mobile location center.
Figure 3B:
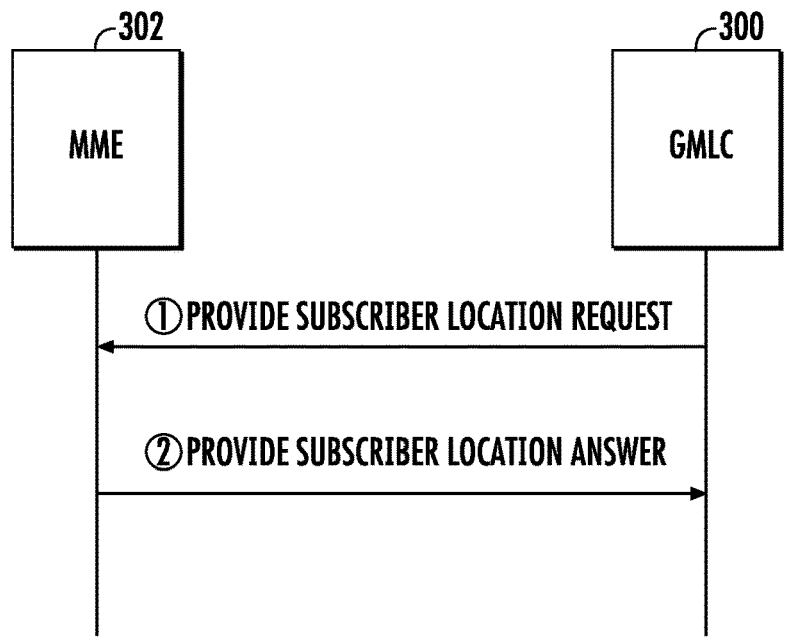
Figure 3C:
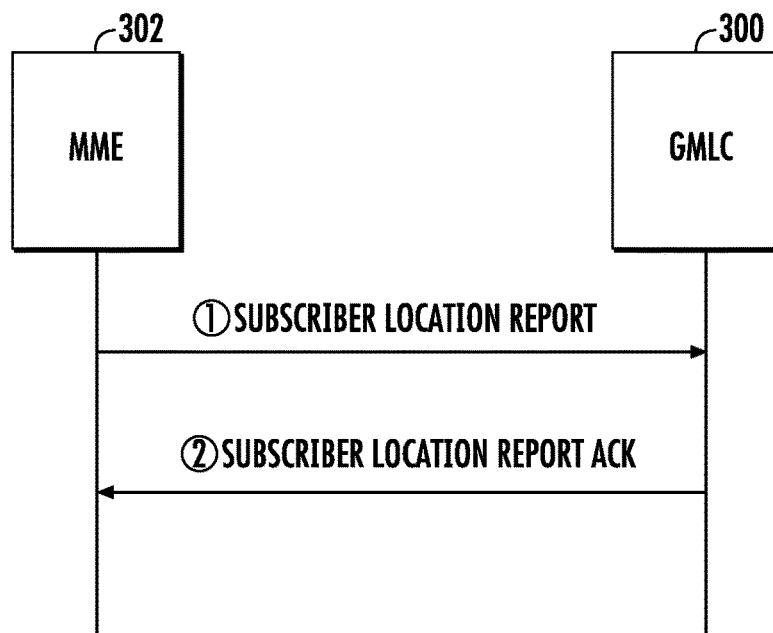

In yet another alternate implementation of the subject matter described herein, UE location validation module 102 may query a mobile location center, such as a gateway mobile location center (GMLC), to obtain UE location information for location validation. FIG. 3A illustrates such an implementation. Referring to FIG. 3A, GMLC 300 stores subscriber location information obtained from a real MME 302. MME 302 is connected to UE 114 through an eNode B 304. Example processes by which GMLC 300 obtains the location information are illustrated in FIGS. 3B and 3C. Referring to FIG. 3B, in one example, GMLC 300 may query MME 302 for location information using a provide subscriber location request message. The provide subscriber location request message contains the UE subscribers IMSI as well as the type of location information requested (e.g., current location and optionally velocity). Table 3 shown below illustrates mandatory and optional fields that can be included in a provide subscriber location request message.

TABLE 3

Mandatory Optional Fields in a Provide Subscriber Location Request

| Information element name | Mapping to Diameter (AVP) | Cat. | Description |
|---|---|---|---|
| Location Type | SLg-Location Type | M | This Information Element (IE) shall contain the type of location measurement requested etc. (see 3GPP TS 22.071. |
| IMSI | User-Name | C | If present, this IE shall contain the IMSI of the user whose UE is to be positioned (see Note 1). |
| MSISDN | MSISDN | C | If present, this IE shall contain the MSISDN of the user whose UE is to be positioned (see Note 1). |
| IMEI | IMEI | C | If present, this IE shall contain the IMEI of the UE to be positioned (see Note 1). |
| Client Name | Location Services Enhanced Packet System (LCS-EPS) Client | M | This IE shall contain the name of the LCS issuing the positioning request. |

TABLE 3-continued

Mandatory Optional Fields in a Provide Subscriber Location Request

| Information element name | Mapping to Diameter (AVP) | Cat. | Description |
|---|---|---|---|
| Client Type | LCS-Client Type | M | This IE shall contain the type of LCS client (Emergency, Lawful Interception . . . issuing the positioning request (see 3GPP TS 23.271 and 3GPP TS 32.299. |
| Requestor Name | LCS-Requestor-Name | O | If present, this IE contains the identity of the originating entity which has requested the location of the target UE from the LCS client. |
| Priority | LCS-Priority | O | If present, this IE shall contain the priority of the LCS client issuing the positioning request. |
| Quality of Service (QoS) | LCS-QoS | O | If present, this IE shall contain the quality of service requested, such as the accuracy of the positioning measurement and the response time of the positioning operation. |
| Velocity Requested | Velocity-Requested | O | If present, this IE shall contain an indication of whether or not the Velocity of the target UE is requested. |
| Supported Geographic Area Description (GAD) Shapes | LCS-Supported-GAD-Shapes | O | If present, this IE shall contain the list of supported GAD shapes by the LCSclient. |
| Service Type ID | LCS-Service-Type-ID | O | If present, this IE shall contain the service type associated for the particular positioning request (the meaning of the different service types is defined in 3GPP TS 22.071. |
| Codeword | LCS-Codeword | O | If present, this IE shall contain the Codeword to be used between an LCS client and a target UE in order to check and accept or reject the positioning request. |
| Access Point Name (APN) | Service-Selection | C | If present, this IE shall contain the Network Identifier of the LCS client, as used by the target UE. It shall only be included in session-related location requests. |
| Session-Related Privacy Check | LCS-Privacy-Check-Session | O | If present, this IE shall contain an indication of how the positioning operation should proceed in the relation to the checking of the session-related privacy settings of the user. |
| Non-Session Related Privacy Check | LCS-Privacy-Check-Non-Session | O | If present, this IE shall contain an indication of how the position operation should proceed in the relation to the checking of the non-session-related privacy settings of the user. |
| Supported Features (See 3GPP TS 29.229 | Supported-Features | O | If present, this IE shall contain the list of features supported by the origin host. |

Note1:
At least one of these IEs shall be present in the message

In Table 3, the mandatory fields in the provide subscriber location information request include either the IMSI, MSISDN, or the IMEI and the location type requested. Other mandatory fields include the name of the location services client issuing the request and the client type.

In response to receiving the subscriber location information request message, MME 302 responds with a provide subscriber location response. Table 4 shown below illustrates mandatory and optional fields of a provide subscriber location response message.

TABLE 4

Mandatory and Optional Fields in Provide Subscriber Location Response

| Information element name | Mapping to Diameter (AVP) | Cat. | Description |
|---|---|---|---|
| Result | Result-Code/Experimental-Result | M | This Information Element shall contain the result of the operation. The result-Code AVP shall be used to indicate success/errors as defined in the Diameter Base Protocol. The experimental-Result AVP shall be used for ELP errors. This is a grouped AVP which shall contain the 3GPP Vendor ID in the Vendor-ID AVP, and the error code in the Experimental-Result-Code AVP. |
| Location Estimate | Location-Estimate | O | If present, this Information Element shall contain tan estimate of the location of the UE in universal coordinates and the accuracy of the estimate. |
| Accuracy Fulfillment Indicator | Accuracy-Fulfillment Indicator | O | If present, this Information Element shall contain an indication of whether the requested accuracy (as indicated in the LCS-QoS IE in the request message) was fulfilled or not. |
| Age of Location Estimate | Age-of-Location Estimate | O | If present, this Information Element shall contain an indication of how long ago the location estimate was obtained. |

TABLE 4-continued

Mandatory and Optional Fields in Provide Subscriber Location Response

| Information element name | Mapping to Diameter (AVP) | Cat. | Description |
|---|---|---|---|
| Velocity Estimate | Velocity-Estimate | O | If present, this information Element shall contain as estimate of the velocity of the target UE, composed by horizontal speed, vertical speed, and their respective uncertainty (see 3GPP TS 23.032). |
| Evolved Universal Mobile Telecommunications System Terrestrial Radis Access Network (EUTRAN) Positioning Data | EUTRAN-Positioning-Data | O | If present, this Information Element shall indicate the usage of each positioning method that was attempted to determine the location estimate, either successfully or unsuccessfully. The internal structure and encoding is defined in 3GPP TS 29.171. |
| ECGI | ECGI | O | If present, this Information Element shall contain the current cell location of the target UE. The E-TRAN Cell Global Identifier (ECGI) is used to globally identify a cell. |
| Target Serving Node Identity | Serving-Node | O | If present, this information element shall contain the address of the target side serving node for handover of an IMS Emergency Call. |
| Supported Features (See 3GPP TS 29.229 | Supported-Features | O | If present, this information element shall contain the list of features supported by the origin host. |

As illustrated in Table 4, optional fields in the provide subscriber location response include location information, such as an estimate of the location of the UE in universal coordinates, an indication of the accuracy of the location information, age of location information, velocity estimate, server node, etc. Any one more or more of these optional information fields may be used by UE location validation module 102 to validate UE location information extracted from an update location request message. For example, UE location validation module 102 may obtain a location estimate from GMLC 300. UE location validation module 102 may compare the location estimate obtained from GMLC 300 to the mobile network and mobile country code extracted from the ULR message. If the location estimate indicates the UE is in a different location than the location corresponding to the country and network obtained from the ULR message, UE location validation module 102 may block the ULR message from being forwarded to HSS 104. If the location estimate matches the mobile network and country code obtained from the ULR message, UE location validation module 102 may allow the ULR message forwarded to HSS 104 for further location update processing.

GMLC 300 may also obtain subscriber location information from MME 302 without sending a provide subscriber location request message. This procedure is illustrated in FIG. 3C. In FIG. 3C, MME 302 sends a subscriber location report message to GMLC 300 without first being queried for the location information. Table 5 shown below illustrates exemplary location and other information that can be included in a provide subscriber location report message.

TABLE 5

Mandatory and Optional Fields from Subscriber Location Report Message

| Information element name | Mapping to Diameter Attribute Value Pair (AVP) | Cat. | Description |
|---|---|---|---|
| Location Event | Location-Event | M | This Information Element shall contain the type of event that caused the location procedure to be initiated. |
| IMSI | User-Name | C | If present, this Information Element shall contain the IMSI of the user whose UE is to be positioned (see Note 1). |
| MSISDN | MSISDN | C | If present, this Information Element shall contain the MSISDN of the user whose UE is to be positioned (see Note 1). |
| IMEI | IMEI | C | If present, this Information Element shall contain the IMEI of the UE to be positioned (see Note 1). |

TABLE 5-continued

Mandatory and Optional Fields from Subscriber Location Report Message

| Information element name | Mapping to Diameter Attribute Value Pair (AVP) | Cat. | Description |
| --- | --- | --- | --- |
| Client Name | LCS-EPS-Client-Name | O | If present, this Information Element shall contain the name of the LCS client where the result of the positioning operation should be sent. |
| Location Estimate | Location-Estimate | O | If present, this Information Element shall contain an estimate of the location of the UE in universal coordinates and the accuracy of the estimate. |
| Accuracy Fulfillment Indicator | Accuracy-Fulfillment-Indicator | O | If present, this Information Element shall contain an indication of whether the requested accuracy was fulfilled or not. |
| Age of Location Estimate | Age-of-Location Estimate | O | If present, this Information Element shall contain an indication of how long ago the location estimate was obtained. |
| Velocity Estimate | Velocity-Estimate | O | If present, this Information Element shall contain an estimate of the velocity of the UE, composed by horizontal speed, vertical speed, and their respective uncertainty (see 3GPP TS 23.032). |
| EUTRAN Positioning Data | EUTRAN-Positioning-Data | O | If present, this Information Element shall indicate the usage of each positioning method that was attempted to determine the location estimate, either successfully or unsuccessfully. The internal structure and encoding is defined in 3GPP TS 29.171. |
| ECGI | ECGI | O | If present, this Information Element shall contain the current cell location of the target UE. The E-UTRAN Cell Global Identifier (ECGI) is used to globally identify a cell. |
| Service Type ID | LCS-Service-Type ID | O | If present, this Information Element shall contain the service type associated for the particular positioning report identifying the service at the receiving LCS Client (the meaning of the different service types is defined in 3GPP TS 22.071). |
| Pseudonym Indicator | Pseudonym-Indicator | O | If present, this Information Element shall contain an indication of whether or not a pseudonym must be allocated by the network and transferred to the LCS client as the identity of the UE. |
| Supported Features (See 3GPP TS 29.229 [17]) | Supported-Features | O | If present, this information element shall contain the list of features supported by the origin host. |
| LCS QoS Class | LCS-QoS-Class | O | If present, this Information Element shall contain the LCS-QoS-Class requested by the target UE. |
| Target Serving Node Identity | Serving-Node | O | If present, this information element shall contain the address of the target side serving node for handover of an IP multimedia subsystem (IMS) Emergency Call. |

NOTE 1:
At least one of these IEs shall be present in the message.

As illustrated in Table 5 above, the subscriber location report message includes the IMSI, MSISDN, or IMEI of the subscriber. The subscriber location report message also includes various fields that specify subscriber location, location accuracy, and location time. As will be described in further detail below, UE location validation module 102 may use this location information to validate location information extracted from a Diameter ULR message. In FIG. 3C, in response to the subscriber location report message, GMLC 300 sends a subscriber location report ACK indicating successful or unsuccessful processing of the subscriber location report message. The structure of the subscriber location report ACK message is not important to the subject matter described herein and therefore a description thereof is not provided.

Returning to FIG. 3A, when UE location validation module 102 receives a ULR message from attacker 118 masquerading as an MME, UE location validation module 102 sends a request for location information to GMLC 300. The request may be formatted according to an API through which GMLC 300 allows UE location validation module 102 to access location data maintained by GMLC 300. The request for location information may include the IMSI, MSISDN, and/or IMEI of the UE. GMLC 300 may access its internal location database using the subscriber identifier (s) included in the request from location validation module 102, locate a record containing location information for the UE, and provide that information to UE location validation module 102 by sending a location information response message to UE location validation module 102. UE location validation module 102 may compare the location information extracted from the ULR message with the UE location information obtained from GMLC 300. Table 1 illustrated above illustrates mandatory and optional fields in the ULR that may be compared to the location data obtained from GMLC 300.

As stated above with regard to Table 1, the location information from the ULR that is of interest for validation may include the visited PLMN ID field. The visited PLMN ID field contains the mobile country code and the mobile network code. The mobile country code and the mobile network code may be compared to the location information obtained from GMLC 300. For example, the mobile country code and mobile network call can be compared to the data extracted from the location estimate field of the subscriber location report message and stored by GMLC 300. If the information matches, UE location validation module 102 may forward the ULR message to HSS 104 without further UE location validation processing. If the information in the ULR message does not match the information obtained from GMLC 300, UE location validation 102 may block the ULR message from being forwarded to HSS 104, mark the message as suspicious, and send a copy of the message to fraud analytics platform 106. Fraud analytics platform 106 may process the ULR message to identify attacker 118 masquerading as an MME and possibly populate an access control database in network gateway 100 to block further messages from attacker 118.

Figure 4:
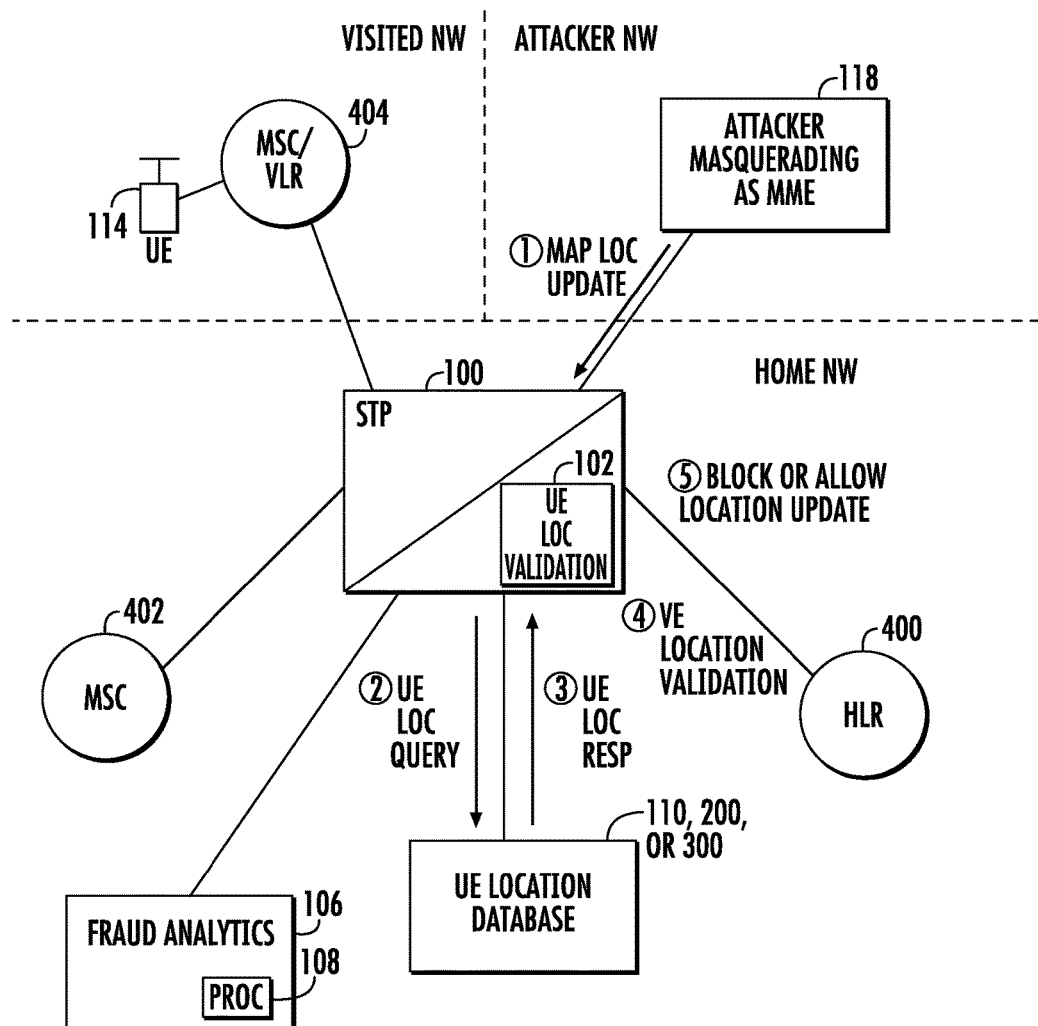
FIG. 4 is a network diagram illustrating methods and systems for validating UE location in an SS7 network.

The examples in FIG. 1-3 focus on identifying fraudulent Diameter update location request messages. However, the subject matter described herein is not limited to identifying fraudulent Diameter update location request messages. Network gateway 100 may also identify fraudulent signaling system seven (SS7) mobile application part (MAP) location update message. FIG. 4 illustrates such an example. In FIG. 4, network gateway 100 comprises a signal transfer point (STP) including UE location validation module 102. Network gateway 100 is located in the home network of UE 114 and routes messages to and from HLR 400, which contains subscription data for UE 114. STP 100 is also connected to a mobile switching center (MSC) 402 located in the home network and a UE location database, which may be database 110, 200, or 300 described above.

In an illustrated example, UE 114 is roaming in a visited network and is currently attached to MSC/VLR 404 in the visited network. Attacker 406 is located in an attacker network separate from the visited network and masquerades as an MSC/VLR. In the illustrated example, attacker 406 sends a MAP location update message to HLR 400. The location update message includes an identifier, such as an IMSI, MSISDN and/or IMEI identifying UE 114. The location update message is an (Interim Standard-41) IS-41 message carried in a mobile application part of an SS7 message and contains an identifier of the MSC/VLR serving the subscriber and also the SS7 point code of the MSC/VLR. In response to receiving the MAP location update message, UE location validation module 102 may query UE location database 110, 200 or 300 with a subscriber or UE identifier and obtain a location response with UE location data from database 110, 200 or 300. UE location validation module 102 then performs a UE location validation by comparing the location information extracted from the MAP location update message with the UE location information obtained from UE location database 110, 200 or 300. If the locations do not match, UE location validation module 102 may mark the location update message as suspicious, block the location update message from being sent to HLR 400, and forward a copy of the suspicious location update message to fraud analytics platform 106 for further processing. Fraud analytics platform 106 may extract the MSC/VLR address and use that information to populate an access control database in STP 100 to block further messages from attacker 118. If UE location validation module 102 determines that the location in the MAP location update message matches the UE location obtained from database 110, 200 or 300, UE location validation module 102 may forward the location update message to HLR 400 without further location validation processing. Thus, UE location validation module 102 performs UE location validation for SS7 location update messages.

Figure 5:
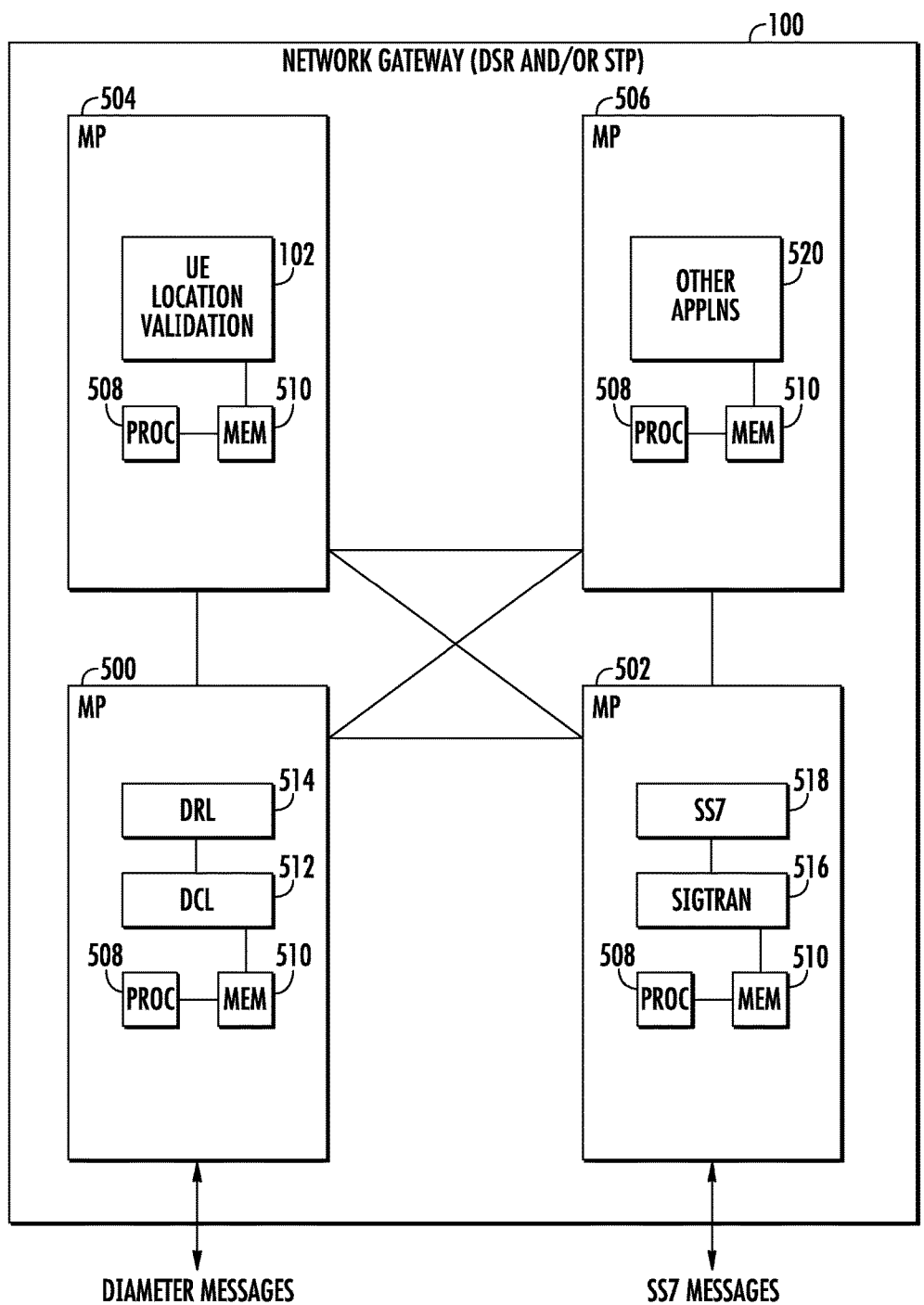
FIG. 5 is a block diagram illustrating a network gateway comprising a Diameter signaling router and/or an SS7 signal transfer point (STP) for validating UE location.

FIG. 5 is a block diagram illustrating an exemplary internal architecture for network gateway 100. In the illustrated example, network gateway 100 includes Diameter signaling router (DSR) and/or STP functionality. DSR functionality may include the ability to operate as a Diameter routing agent (DRA) and/or a Diameter edge agent (DEA). Operating as a Diameter routing agent includes routing and screening Diameter signaling messages based on Diameter information in the signaling messages. Operating as a Diameter edge agent may include routing and screening Diameter signaling messages at the edge of a network or border between two networks based on Diameter level information in the messages. Operating as an STP may include routing and/or screening SS7 messages based on SS7 information in the messages. Thus, network gateway 100 may be a DSR, an STP, or a combination of a DSR and an STP.

Network gateway 100 may perform UE location validation for SS7 location update messages and Diameter update location request messages originating from attackers masquerading as MMEs in long term evolution networks or as MSC/VLRs in SS7 networks. If network gateway 100 implements STP functionality, location validation module 102 can validate location information in SS7 MAP location update messages and block the forwarding of such messages to an HLR upon failed UE location validations. If network gateway 100 implements DSR functionality, location validation module 102 can block the forwarding of Diameter ULR messages to an HSS upon failed UE location validations.

Referring to the architecture of FIG. 5, network gateway 100 includes a plurality of message processors 500, 502, 504, and 506. Each message processor includes at least one processor 508 and memory 510. Each message processor may be implemented using a printed circuit board, such as a blade and associated connectivity to other on the circuit boards via a backplane or other connection.

Each message processor 500, 502, 504, and 506 may be configured with software to perform a particular function or functions. In the illustrated example, message processor 500 is configured with software that implements Diameter connection and routing functionality. Message processor 500 therefore includes a Diameter connection layer (DCL) 512 that maintains Diameter connections with other Diameter nodes and a Diameter routing layer (DRL) 514 that routes Diameter messages to other nodes and to message processors 504 and 506 for application processing.

Message processor 502 is configured with software that implements SS7 connection and routing functionality. Accordingly, message processor 502 includes a signaling transport (SIGTRAN) protocol stack 516 that allows SS7 messages to be transported over IP networks and SS7 protocol stack 518 (minus MTP layers 1 and 2) that carries SS7 information, such as MTP3, signaling connection control part (SCCP), transaction capabilities application part (TCAP), and MAP information.

Message processor 504 includes UE location validation module 102 for performing UE location validation as described above. Message processor 506 may include other applications 520 for processing Diameter and/or SS7 messages. Examples of other applications that may be implemented include number portability, global title translation, HLR or HSS location caching, etc.

Thus, when a location update message, such as a Diameter ULR or an SS7 MAP location update message, arrives at one of message processors 500 and 502, the receiving message processor forwards the message to message processor 504 for UE location validation processing. UE location validation module 102 validates the message by querying the appropriate location information source, obtaining the external location information, and using that information to compare with the information extracted from the location update message. If the message passes the UE location validation, UE location validation module 102 forwards the message to the HLR or the HSS via the appropriate egress message processor 500 or 502. If the message does not pass UE location validation, UE location validation module 102 marks the message as suspicious and sends a copy of the message to fraud analytics platform 106 via one of message processors 500 or 502.

Figure 6:
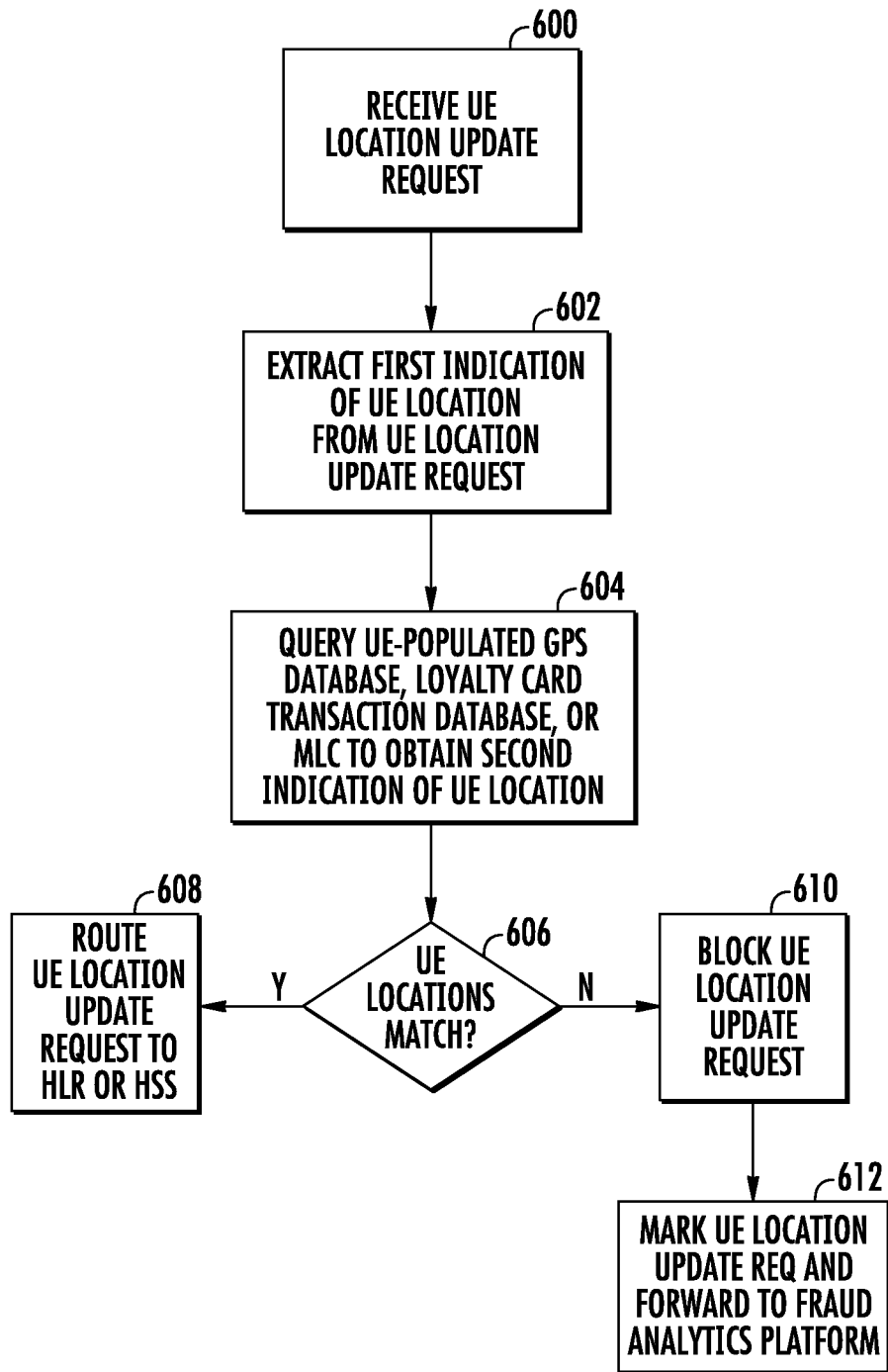
FIG. 6 is a flow chart illustrating an exemplary process for validating UE location.

FIG. 6 is a flow chart illustrating an exemplary process for validating UE location information according to an aspect of the subject matter described herein. Referring to FIG. 6, in step 600, a UE location update request is received. For example, network gateway 100 may receive a Diameter ULR message or an SS7 MAP location update message. In step 602, a first indication of location of the UE to which the location update request pertains is extracted from the UE location update request. For example, UE location validation module 102 may extract the visited PLMN ID or other data indicating the location from which the UE location update request originated. In step 604, network gateway 100 queries one of a cloud-based UE location database containing UE location information obtained from a UE location reporting application resident on the UE, a cloud-based loyalty card transaction database containing loyalty card transaction records indexed by UE identifiers, and a mobile location center (MLC) that obtains UE location information by requesting or receiving the UE location information from a mobility management entity (MME) to obtain a second indication of location of the UE to which the location update request pertains. For example, UE location validation module 102 may query cloud GPS database 110, loyalty card transaction database 200, or GMLC 300 to obtain the second indication of location of the UE. The query may include the IMSI, MSISDN, IMEI, or other identifier for the UE.

In step 606, it is determined whether the first and second indications of location of the UE match. Determining whether the indications of UE location match may include comparing the location obtained from the cloud-based UE location database, the cloud-based loyalty card transaction database or the MLC to the location extracted from the signaling message for updating the location of the subscriber. If the external location source is cloud GPS database 110, the comparing may include determining whether the mobile network specified by the MNC extracted from the update location message has radio coverage at the location specified by the GPS coordinates. Similarly, if the external location source is loyalty card transaction database 200, determining whether the indications of location match may include determining whether the transaction locations obtained from loyalty card transaction database 200 correspond to locations where the mobile network specified by the MNC specified by the mobile network code in the location update message has radio coverage. If the external location source is GMLC 300, determining whether the first and second indications of location of the UE match may include determining whether the network specified by the MNC in the update location message has radio coverage at the coordinates specified by the location estimate obtained from GMLC 300. It should be understood that these location comparisons are given for example purposes only and any field from a Diameter update location request or an SS7 location update message that specifies UE location or from which UE location can be derived can be compared with any of the parameters listed herein that specify UE location or from which UE location can be derived without departing from the scope of the subject matter described herein.

If the first and second indications of location of the UE match, control proceeds to step 608 where the UE location update request is routed to the HLR or HSS and UE location validation processing ends. If however, in step 606, it is determined that the UE location information does not match, control proceeds to step 610 where the UE update location request is blocked or prevented from being forwarded from to the HLR or HSS. Control then proceeds to step 612 where the UE update location request is marked as suspicious and forwarded to fraud analytics platform 106. Fraud analytics platform 106 many analyze the suspicious update location request message, create data for an access control list entry for blocking future communications from the attacker, and forward the data to network gateway 100 for installation in an access control list maintained by network gateway 100.

Instead of creating an access control list entry, fraud analytics platform 106 may flag the MSISDN, IMSI, and/or IMEI associated with the location update messages and create data for populating a screening database maintained by network gateway 100 and forward the screening data to network gateway 100. Network gateway 100 may install the screening data in a screening database so that any message received by network gateway 100 that includes the MSISDN, IMSI, and/or IMEI is copied, and the message copy is sent to fraud analytics platform 106 for further fraud analysis. If the further analysis indicates that the message originated from an attacker, fraud analytics platform 106 may notify the network operator and/or generate data for a screening database rule that blocks future messages involving the MSISN, IMSI, and/or IMEI.

In the examples described above, UE location validation is performed by UE location validation module 102 residing on network gateway 100. However, the subject matter described herein is not limited to such an implementation. In an alternate implementation, UE location validation module 102 may be located on a computing platform separate from network gateway 100 but operatively associated with network gateway 100. In such an implementation, network gateway 100 may receive the location update message, and forward the message or a copy of the message from the message and forward the UE to UE location validation module 102. UE location validation module 102 may extract the location information from the message, obtain the location message from the location source, such as database 110, 200, or 300. UE location validation module 102 may then perform the validation and send a validation result to network gateway 100. If the validation result indicates that the message passes the UE location validation, then the validation result indicates such passing, and gateway 100 forwards the update location message to the HLR or the HSS. If the validation result indicates that the message fails the UE location validation, UE location validation module 102 may forward a policy rule to gateway 100 where the policy rule indicates that the update location message should not be forwarded to the HLR or HSS. Network gateway 100 may install the policy rule and use the policy rule to block forwarding of the update location message to the HLR or HSS.

In the examples described above, databases 110, 200, and 300 are located on computing platforms separate from network gateway 100. In an alternate embodiment, any one or more of databases 110, 200, or 300 or a local copy of any one or more of databases 110, 200, or 300 may reside on network gateway 100. In such an implementation, network traffic may be reduced over the implementations described above because the need to forward location queries and responses across a network is obviated.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for validating user equipment (UE) location, the method comprising:
   receiving, at a network gateway, a signaling message for updating a location of a UE with a mobile communications network;
   extracting a first indication of location of the UE from the signaling message;
   obtaining, by querying one of a cloud-based UE location database containing UE location information obtained from a UE location reporting application resident on the UE, a cloud-based loyalty card transaction database containing loyalty card transaction records indexed by UE identifiers, and a mobile location center (MLC) that obtains UE location information by requesting or receiving the UE location information from a mobility management entity (MME), a second indication of location of the UE;
   determining, from a relationship between the first and second indications of location of the UE, that the signaling message is suspicious; and
   in response to determining that the signaling message is suspicious, applying a policy rule to processing of the signaling message.

2. The method of claim 1 wherein the signaling message comprises one of a Diameter update location request (ULR) message and an SS7 location update message.

3. The method of claim 1 wherein the first indication of location of the UE comprises a network identity extracted from the signaling message.

4. The method of claim 3 wherein the network identity includes a visited public land mobile network (PLMN) identifier.

5. The method of claim 4 wherein the visited PLMN identifier includes a mobile network code (MNC) and a mobile country code (MCC).

6. The method of claim 1 wherein the second indication of location of the UE comprises global positioning system (GPS) coordinates of the UE and wherein determining, from a relationship between the first and second indications of location of the UE, that the signaling message is suspicious includes determining that a location indicated by the GPS coordinates does not match the first indication of location of the UE.

7. The method of claim 6 wherein the GPS coordinates of the UE are obtained from the cloud-based UE location database containing UE location information populated by the UE location reporting application on the UE.

8. The method of claim 1 wherein the second indication of location of the UE comprises a loyalty card transaction location obtained from the cloud-based loyalty card transaction database and wherein determining, from a relationship between the first and second indications of location of the UE, that the signaling message is suspicious includes determining that the loyalty card transaction location does not match the first indication of location of the UE.

9. The method of claim 1 wherein the second indication of location of the UE comprises a location obtained from the cloud-based loyalty card transaction database and wherein determining, from a relationship between the first and second indications of location of the UE, that the signaling message is suspicious includes determining that the location obtained from the loyalty card transaction database does not match the first indication of location of the UE.

10. The method of claim 1 wherein applying the policy rule includes blocking the signaling message from being forwarded to a home subscriber server (HSS) or a home location register (HLR), marking the signaling message as suspicious, and forwarding a copy of the message to fraud analytics platform.

11. A system for validating user equipment (UE) location, the system comprising:
   a network gateway;
   a message processor located in the network gateway for receiving a signaling message for updating a location of a UE with a mobile communications network;
   a UE location validation module operatively associated with the network gateway for extracting a first indication of location of the UE from the signaling message, obtaining, by querying one of a cloud-based UE location database containing UE location information obtained from a UE location reporting application resident on the UE, a cloud-based loyalty card transaction database containing loyalty card transaction records indexed by UE identifiers, and a mobile location center (MLC) that obtains UE location information by requesting or receiving the UE location information from a mobility management entity (MME), a second indication of location of the UE, determining, from a relationship between the first and second indications of location of the UE, that the signaling message is suspicious; and wherein the network gateway, in response to a determination that the signaling message is suspicious, applies a policy rule to processing of the signaling message.

12. The system of claim 11 wherein the signaling message comprises one of a Diameter update location request (ULR) message and an SS7 location update message.

13. The system of claim 11 wherein the first indication of location of the UE comprises a network identity extracted from the signaling message.

14. The system of claim 13 wherein the network identity includes a visited public land mobile network (PLMN) identifier.

15. The system of claim 11 wherein the second indication of location of the UE comprises global positioning system (GPS) coordinates of the UE and wherein determining, from a relationship between the first and second indications of location of the UE, that the signaling message is suspicious includes determining that a location indicated by the GPS coordinates does not match the first indication of location of the UE.

16. The system of claim 15 wherein the GPS coordinates of the UE are obtained from the cloud-based UE location database containing UE location information populated by the UE location reporting application on the UE.

17. The system of claim 11 wherein the second indication of location of the UE comprises a loyalty card transaction location obtained from the cloud-based loyalty card transaction database and wherein determining, from a relationship between the first and second indications of location of the UE, that the signaling message is suspicious includes determining that the loyalty card transaction location does not match the first indication of location of the UE.

18. The system of claim 11 wherein the second indication of location of the UE comprises a location obtained from the cloud-based loyalty card transaction database and wherein determining, from a relationship between the first and second indications of location of the UE, that the signaling message is suspicious includes determining that the location obtained from the loyalty card transaction database does not match the first indication of location of the UE.

19. The system of claim 11 wherein applying the policy rule includes blocking the signaling message from being forwarded to a home subscriber server (HSS) or a home location register (HLR), marking the signaling message as suspicious, and forwarding a copy of the message to a fraud analytics platform.

20. A non-transitory computer readable medium having stored thereon executable instructions that when executed by a processor of a computer control the computer to perform steps comprising:

receiving, at a network gateway, a signaling message for updating a location of a UE with a mobile communications network;

extracting a first indication of location of the UE from the signaling message;

obtaining, by querying one of a cloud-based UE location database containing UE location information obtained from a UE location reporting application resident on the UE, a cloud-based loyalty card transaction database containing loyalty card transaction records indexed by UE identifiers, and a mobile location center (MLC) that obtains UE location information by requesting or receiving the UE location information from a mobility management entity (MME), a second indication of location of the UE;

determining, from a relationship between the first and second indications of location of the UE, that the signaling message is suspicious; and in response to determining that the signaling message is suspicious, applying a policy rule to processing of the signaling message.

* * * * *